United States Patent
Collins et al.

(10) Patent No.: US 9,931,747 B1
(45) Date of Patent: Apr. 3, 2018

(54) TOOL HANDLING SYSTEM

(71) Applicant: POWER TORK HYDRAULICS, INC., La Place, LA (US)

(72) Inventors: Robert M. Collins, La Place, LA (US); James David Keyes, Jr., Metairie, LA (US); Geoffrey G. Boughton, Katy, TX (US)

(73) Assignee: POWER TORK HYDRAULICS, INC., LaPlace, LA (US)

( * ) Notice: Subject to any disclaimer, the term of this patent is extended or adjusted under 35 U.S.C. 154(b) by 0 days.

(21) Appl. No.: 14/939,095

(22) Filed: Nov. 12, 2015

(51) Int. Cl.
*B25H 1/00* (2006.01)
*F16F 3/04* (2006.01)

(52) U.S. Cl.
CPC .......... *B25H 1/0028* (2013.01); *F16F 3/04* (2013.01); *F16F 2236/04* (2013.01); *F16F 2236/045* (2013.01); *F16F 2236/06* (2013.01)

(58) Field of Classification Search
CPC ....... B25H 1/0028; B25H 1/0057; F16F 3/04; F16F 3/06; F16F 2236/04; F16F 2236/045; F16F 2236/06; F16L 3/205; F16L 3/2053; F05D 13/12; E05D 13/12; E05D 13/123
USPC ....... 248/575, 576, 578, 580, 602, 610, 611, 248/613, 617, 620, 622, 623; 267/69, 70, 267/71, 72, 73, 74, 168, 289
See application file for complete search history.

(56) References Cited

U.S. PATENT DOCUMENTS

| | | | | |
|---|---|---|---|---|
| 343,946 A | * | 6/1886 | Chamberlayne | A44B 11/008 16/DIG. 36 |
| 854,087 A | * | 5/1907 | Hainlin | F16F 1/46 213/42 |
| 1,222,480 A | * | 4/1917 | Smith | F16F 3/04 267/70 |
| 1,436,079 A | * | 11/1922 | Black | F16F 13/00 267/168 |
| 1,452,436 A | * | 4/1923 | Pullin | B62K 25/24 267/168 |
| 1,842,638 A | * | 1/1932 | Wigle | E21B 19/06 267/70 |

(Continued)

FOREIGN PATENT DOCUMENTS

FR 1527916 A * 10/1968 .............. F16F 3/04

OTHER PUBLICATIONS

The American Heritage Dictionary, definition of frangible, retrieved Jul. 5, 2017, https://ahdictionary.com/word/search.html?q=frangible.*

(Continued)

*Primary Examiner* — Jonathan Liu
*Assistant Examiner* — Guang H Guan
(74) *Attorney, Agent, or Firm* — Roy Kiesel Ford Doody & Thurmon APLC

(57) ABSTRACT

A tool handling system including an overhead counter-balance and a control bar. The counter-balance uses a series of complementary springs to provide a counter-gravitational force to a suspended tool. When the user wishes to lift the tool from its equilibrium position, the user is assisted by the counter-gravitational force of the springs such that the tool may be lifted with only a small fraction of the force necessary to lift the tool unaided. The control bar will allow users to keep any cable away from a riser or other structure on which the tool is being used.

7 Claims, 7 Drawing Sheets

(56) References Cited

U.S. PATENT DOCUMENTS

| | | | | |
|---|---|---|---|---|
| 2,183,138 A | * | 12/1939 | Hall | B64C 13/00 188/69 |
| 2,222,146 A | * | 11/1940 | Jonsson | B06B 3/00 209/365.3 |
| 2,373,125 A | * | 4/1945 | Loepsinger | F16L 3/2053 248/573 |
| 2,437,631 A | * | 3/1948 | Wood | F16F 1/041 248/613 |
| 2,708,525 A | * | 5/1955 | Woleslagle | B27B 17/0083 212/179 |
| 2,873,078 A | * | 2/1959 | Suozzo | F16F 3/04 248/542 |
| 2,907,280 A | * | 10/1959 | Carlson | A22B 7/001 104/89 |
| 2,949,270 A | * | 8/1960 | Wood | F16L 3/2056 248/543 |
| 2,980,374 A | * | 4/1961 | Young | B25H 1/0028 248/610 |
| 3,220,717 A | * | 11/1965 | Altherr | F16G 11/12 267/70 |
| 3,957,260 A | * | 5/1976 | Martin | B60Q 1/08 267/174 |
| 4,025,011 A | * | 5/1977 | Rapps | F16L 3/2053 248/561 |
| 4,697,798 A | * | 10/1987 | Pitter | G01L 5/103 248/542 |
| 4,854,559 A | * | 8/1989 | Fialon | F16F 7/09 188/381 |
| 5,213,301 A | * | 5/1993 | Taguchi | F16F 3/04 248/621 |
| 5,333,845 A | * | 8/1994 | Seiichi | E05F 3/02 267/70 |
| 5,367,924 A | * | 11/1994 | Henson | B25H 1/0028 81/462 |
| 9,157,619 B1 | | 10/2015 | Newton | |
| 9,161,847 B2 | | 10/2015 | Kampas et al. | |
| 9,214,141 B2 | | 12/2015 | McNutt | |
| 9,264,589 B2 | | 2/2016 | Graham | |
| 9,371,172 B2 | | 6/2016 | Marini et al. | |
| 9,422,762 B2 | | 8/2016 | Bren | |
| 9,477,142 B1 | | 10/2016 | Baumgartner | |
| 9,511,412 B2 | | 12/2016 | Jolly | |
| 9,531,287 B1 | | 12/2016 | Johnson | |
| 9,553,423 B2 | | 1/2017 | Chen et al. | |
| 9,554,482 B2 | | 1/2017 | Wilsn et al. | |
| 9,554,570 B2 | | 1/2017 | Adams | |
| 9,555,938 B2 | | 1/2017 | Syrkos | |
| 9,556,570 B1 | | 1/2017 | Wawrzynowski | |
| 9,556,630 B2 | | 1/2017 | Rosati | |
| 9,556,985 B2 | | 1/2017 | Horgan | |
| 9,560,937 B2 | | 2/2017 | Borovicka et al. | |
| 9,561,520 B2 | | 2/2017 | Metayatos et al. | |
| 9,561,880 B2 | | 2/2017 | Luburic | |
| 9,561,884 B2 | | 2/2017 | Kamath | |
| 9,577,412 B2 | | 2/2017 | Prakash et al. | |

OTHER PUBLICATIONS

Collins English Dictionary, definition of frangible, retrieved Jul. 5, 2017, https://www.collinsdictionary.com/dictionary/english/frangible.*

* cited by examiner

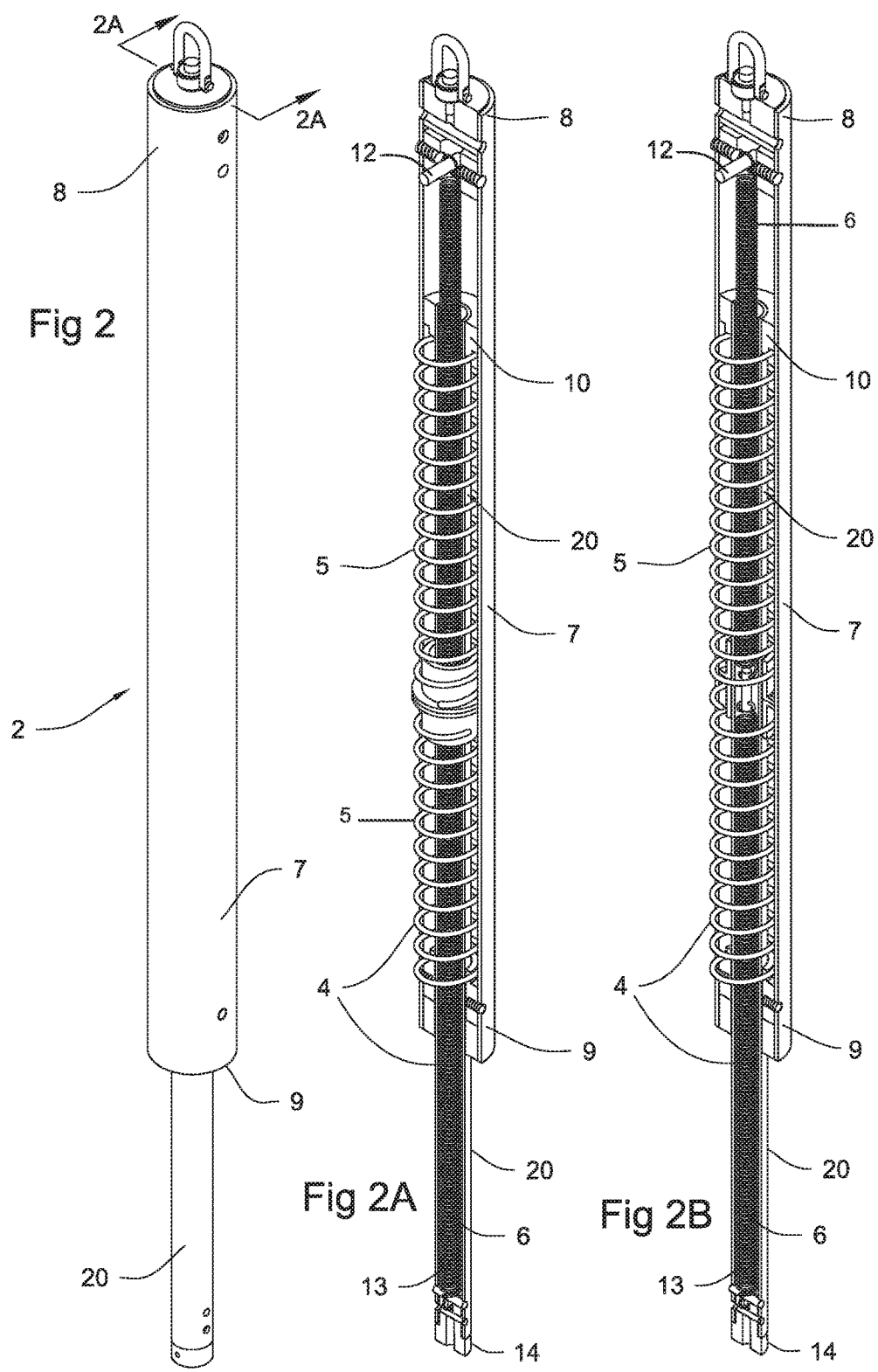

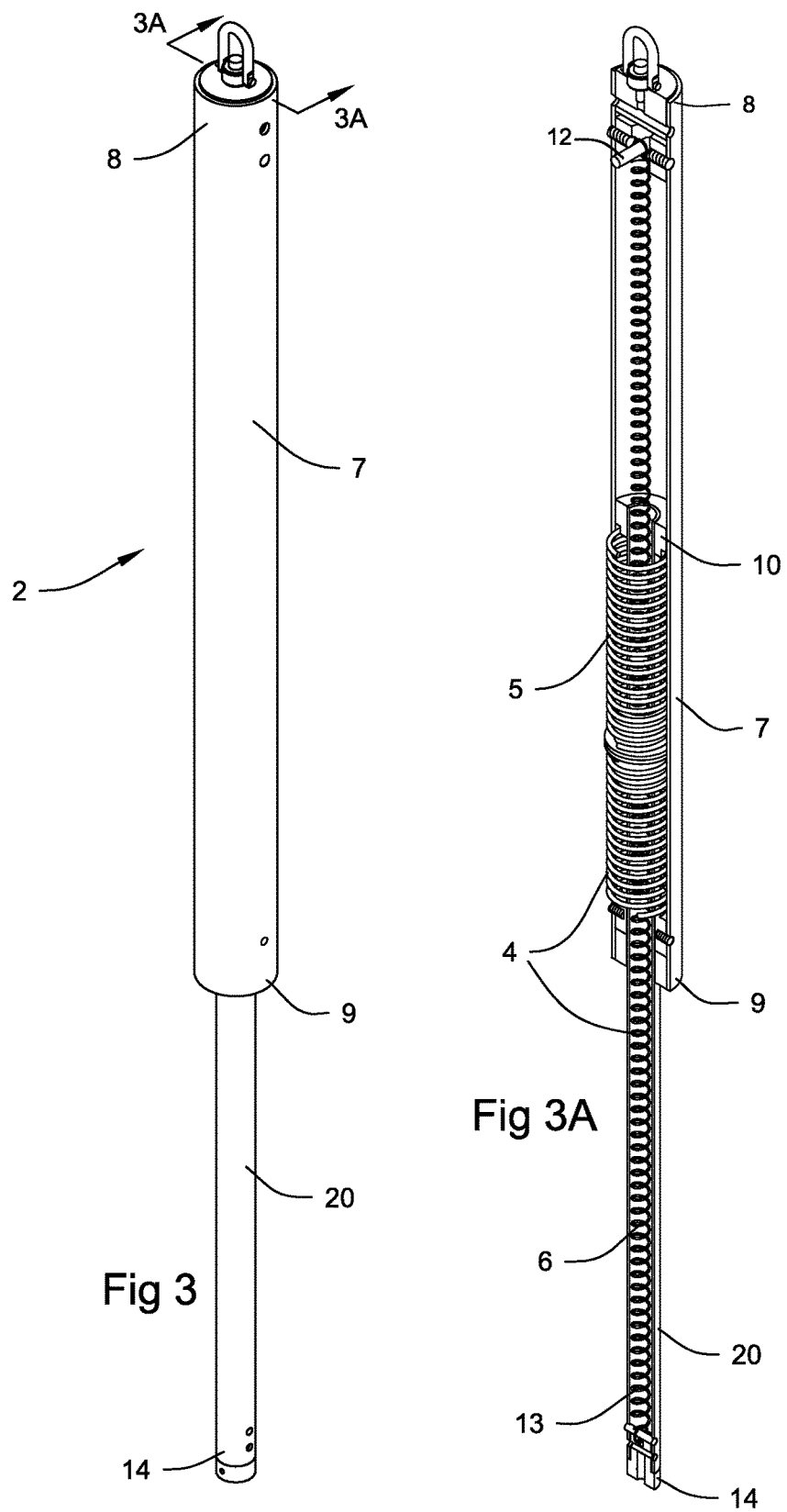

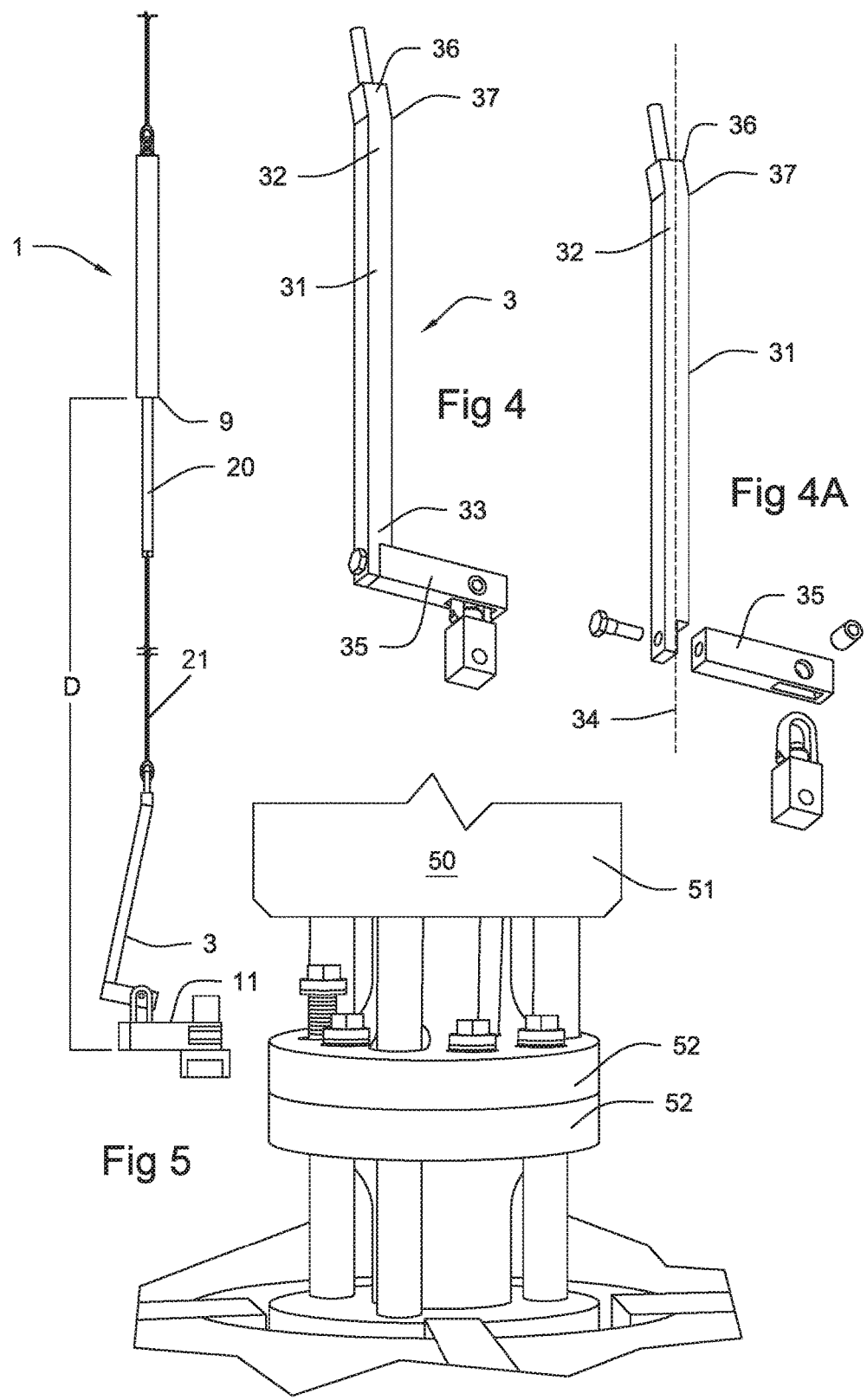

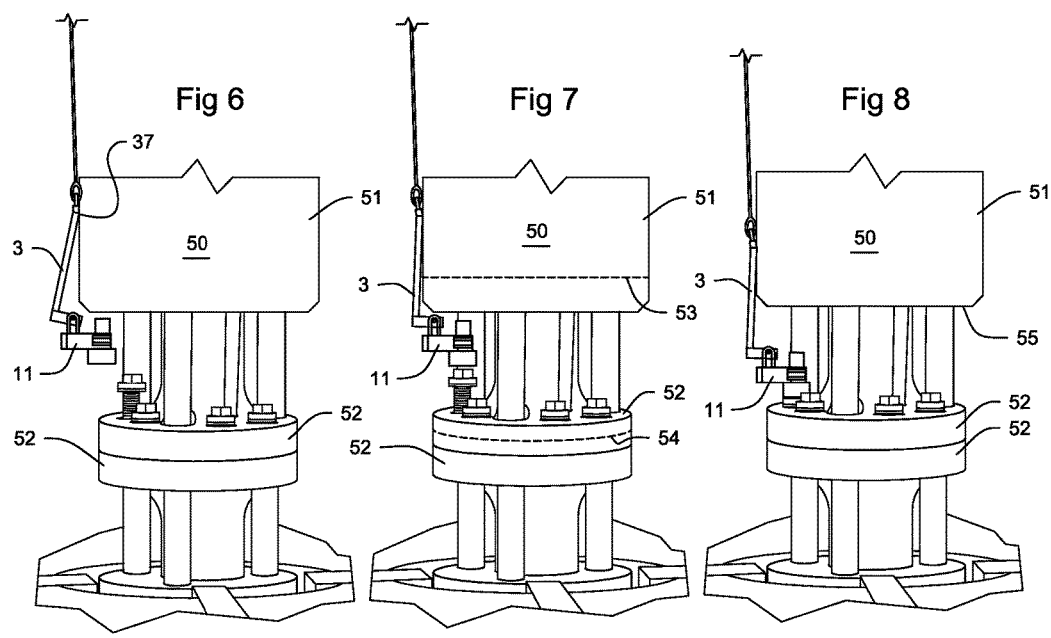

TOOL HANDLING SYSTEM

BACKGROUND

Field of the Invention

The invention relates to tool balancers in general and balancers particularly suited for supporting off-shore hydraulic tools.

Prior Art

Tool balancers, sometimes referred to as "zero-gravity balancers" are known in the art. Such devices allow users to operate the tools without supporting their full weight. Tool balancers usually comprise a cable that extends from a tensioner. The tensioner is configured to apply a generally continuous level of pressure to the cable. For example, a tool might weigh fifty pounds, but the tensioner is set to apply forty-five pounds of pressure to the tool. Thus, the operator need only apply five pounds of pressure to support the tool. Apply slightly more than five pounds, and the tool will rise. Less than five pounds of pressure, and the tool will fall. The tensioner will retract the cable or let it play out, depending on whether the tool is being raised or lowered.

The tensioner will typically comprise a spool onto which the cable is wound. Tension is applied to the spool via a spring, pneumatics, or hydraulics. In each case, the tensioner applies slightly less force to the cable than is necessary to lift the tool. The user can operate the tool while only supporting a fraction of its weight. The tensioner is usually directly or indirectly supported from the ceiling or other overhead structure and may depend from a track, arm, or other similar device configured to facilitate lateral or horizontal motion of the tool.

The amount of force provided by many spool tensioners will vary depending upon how far the cable is extended. The tensioner will have a maximum range the cable may be extended. As the cable is extended to near its maximum range, the force applied to the tool being suspended will vary. As a general rule, the heavier the tool being supported, the narrower the extension range of the tensioner. With some prior art tensioners, the extension range is so limited that the spool must be positioned just over the operator's head. This will result in a relatively short length of cable between the end of the tensioner and the tool. The short cable can make positioning the tool properly difficult.

Unfortunately, failure of the tensioner can result in dangerous situations for the tool operator. A tool can suddenly go from having a felt weight of twenty or thirty pounds to its real weight of several hundred pounds. This can lead to crushed limbs and extremities for the operator, broken bones, back and soft tissue injuries due to operators suddenly being subjected to the significant weight of the tool, and fall related injuries associated with operator efforts to avoid the suddenly heavy tool. Failure of the tensioner can also result in damage to the tool itself and to the equipment being worked with the tool. The latter is of particular concern if the failure occurs while the tool is in operation.

Failure of the tensioner can occur in one of two principle ways. First, the spool or spool components can fail, such that support from the spool is lost or compromised. Second, the cable extending from the spool to the tool can fail.

Short spans of cable between the tensioner and the tool can also create problems. If the tensioner is moving during operation, as it is sometimes the case when it is being used at sea, the tensioner will apply a force to the tool it is supporting. When the tensioner and the tool are connected by a short cable any motion of the tensioner will be more directly imparted to the tool, frequently in a dangerous, jerking manner. However, the longer the cable connecting the tool and the tensioner, the more motion in the tensioner can be dissipated across the cable. All things being equal, a longer cable between the tool and the tension will result in less motion imparted to the tool from a moving tensioner. Motion imparted to a 300 lb. tool obviously creates risk of injury to operators of the tool, and should preferably be minimized.

One application of the tensioner is to support high torque wrenches that are used to make-up and break-out risers in off-shore petroleum operations. Risers are pipes used to support drill and production strings that may be thousands of feet long. These strings are made of dozens to hundreds of sections of pipe, each one bolted to adjacent pipes above and below it in the string. The pipe sections are usually provided with buoyant material that surrounds the exterior of the pipe and substantially increases the outside diameter of each pipe. The buoyant material allows the water to support the weight of the string. Without it, a string thousands of feet long would be too heavy to support.

While the buoyant material is often necessary, it creates an obstacle to those working to make-up or break-out the riser. Consider two sections of riser with mating flanges that are bolted together. The flanges are positioned between the buoyant material on each pipe. Thus, to use a tool suspended from above to work the bolts, the tool must be positioned below the buoyant material of the upper riser section. When the tool is on a cable, the tool is swung on the cable to position the tool between the flange and the buoyant material. That brings the cable into contact with the buoyant material. See, FIG. 1A. Rubbing on the buoyant material can fray or otherwise damage the cable and can lead to cable failure.

In view of the foregoing, an improved tool handling system meeting the following objectives is desired.

OBJECTS OF THE INVENTION

It is an object of the invention to provide an overhead counter-balance for a tool.

It is a still further object of the invention provide an overhead counter-balance that does not depend on a tensioned spool.

It is yet another object of the invention to provide an overhead counter-balance that will bear at least about eighty to ninety percent of the weight of the tool being used.

It is still another object of the invention to provide an overhead counter-balance that will increase the counter-gravitational force applied to the tool as the tool is lowered.

It is yet another object of the invention to provide a control bar for use with an overhead counter-balance to avoid the use of cables in proximity to the tool.

SUMMARY OF THE INVENTION

A tool handling system is disclosed. The tool handing system comprises an overhead counter-balance mounted on pulleys, rails, a pivotable arm, or other conventional means configured to allow horizontal motion of the system. This will commonly include the air hoist line present in many drilling platforms. The counter-balance comprises complimentary springs. The tool depends, directly or indirectly, from one or more extension springs. The weight of the tool will load the extension spring(s). The extension spring(s) are positioned within an extension casing that depends from a block slidably disposed within the counter-balance. Applying force to the extension casing will pull the block toward the tool end of the counter-balance. One or more compression springs are positioned within the counter-balance. As the block is pulled toward the tool end of the counter-balance, the block will load the compression spring(s). In the preferred embodiment, the tool-ends of the extension spring and the extension casing are connected so that a tool hanging directly or indirectly from the extension casing will apply force to the extension spring, the extension housing, the block from which the casing depends, and the compression spring. Together, the compression spring(s) and the extension spring(s) will apply a counter-gravitational force to the tool depending from the counter-balance. The tool will have an equilibrium distance D below the counter-balance wherein the springs are loaded to the greatest extent possible by the weight of the tool alone. At this point, the tool will have an effective weight of zero. The user may lift the tool from point D by manually applying force to the tool. Rather than apply the force necessary to lift the entire weight of the tool, the user need only apply enough force to make up for the marginal diminution of the counter-gravitational force of the springs that occurs as the springs cease to be fully loaded.

A control bar is also provided. The control bar depends from the counter-balance and connects the tool to the counter-balance. Preferably, the control bar extends, directly or indirectly, from the extension casing. The control bar is used instead of or in addition to a cable, wire rope, chain, or the like. By positioning the control bar immediately above the tool, a cable or similar device can be kept away from the expanded outer circumference of a riser or the ledge formed thereby. The control bar is preferably shaped like an elongated, deformed Z. This shape will allow the tool to be pivoted into the desired location below the ledge of the expanded outer circumference of a riser.

BRIEF DESCRIPTION OF THE FIGURES

FIG. 2 is a perspective view of a preferred embodiment of a counter-balance according to the present invention, bearing no load.

FIG. 2A is a cut-away perspective view of the embodiment of a counter-balance shown in FIG. 2.

FIG. 2B is another cut-away perspective view of another embodiment of a counter-balance having two extension springs.

FIG. 3 is a perspective view of a preferred embodiment of a counter-balance according to the present invention, bearing a load.

FIG. 3A is a cut-away perspective view of the embodiment of a counter-balance shown in FIG. 3.

FIG. 4 is a perspective view of a preferred embodiment of a control bar.

FIG. 4A is an exploded view of the embodiment of the control bar shown in FIG. 4.

FIG. 5 is a side view of a preferred embodiment of a counter-balance, control bar, and tool shown in position D adjacent a riser under construction.

FIG. 6 is a depiction of the control bar and tool shown in FIG. 5 wherein the tool has been raised from position D and moved horizontally to bring control bar into contact with the riser body.

FIG. 7 is a depiction of the same elements shown in FIG. 6 wherein the control bar has been pivoted on the riser body to position the tool over the flange.

FIG. 8 is a depiction of the same elements shown in FIG. 7 wherein the tool has been lowered into contact with the flange components.

DETAILED DESCRIPTION OF THE PREFERRED EMBODIMENT

Figure 1:
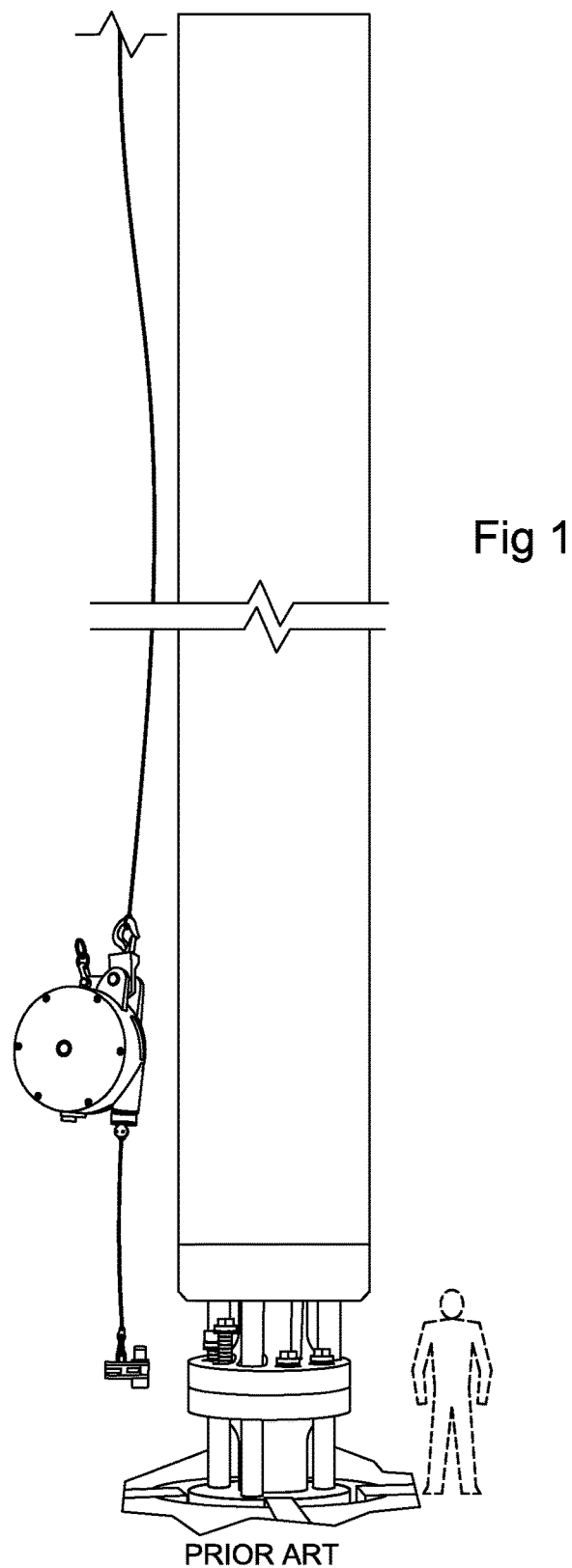
FIG. 1 is a perspective view of a prior art tool tensioner system shown adjacent to a riser.
Figure 1A:
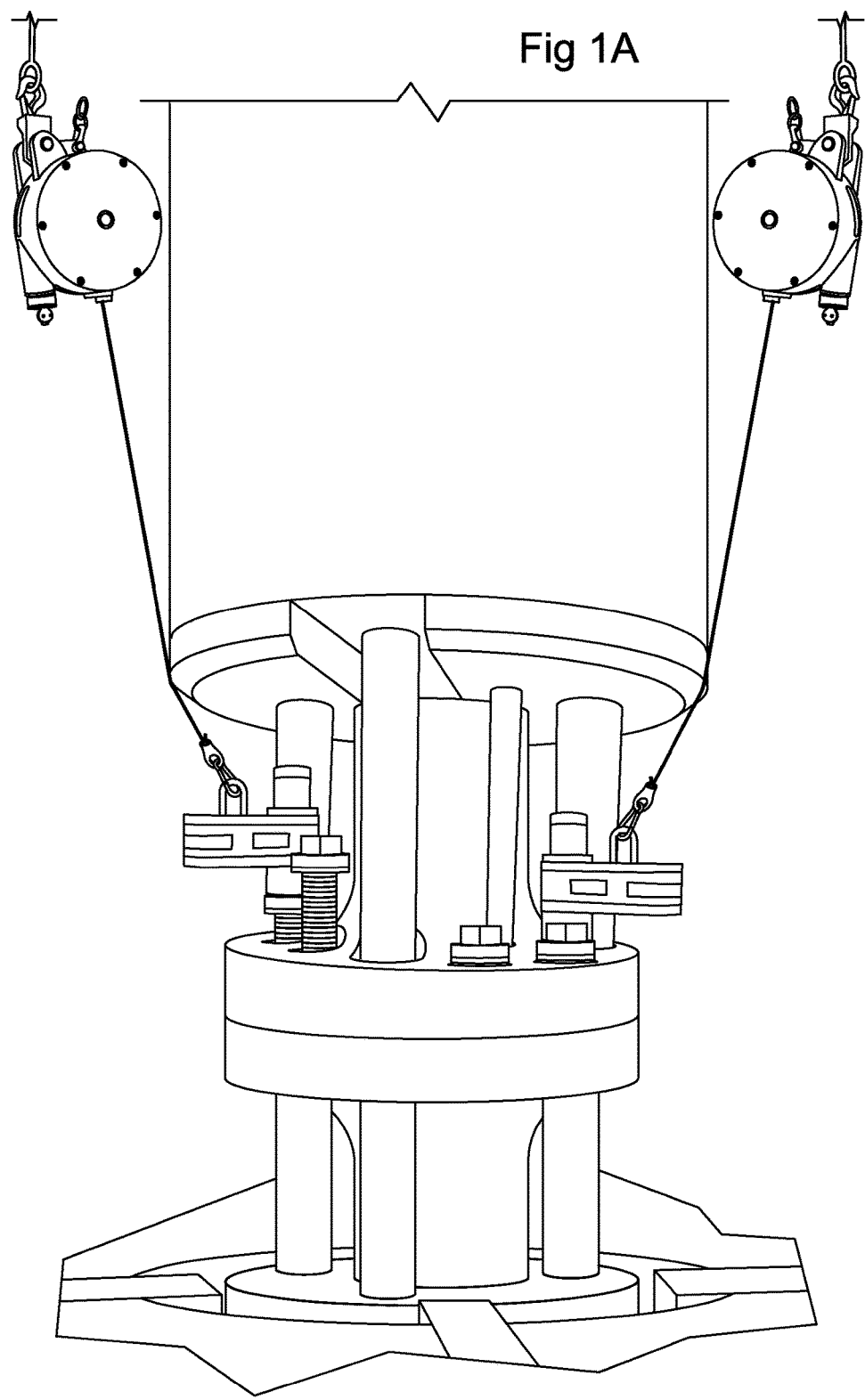
FIG. 1A is a detailed view of the system of FIG. 1 at A, illustrating the interaction of the cable and the riser body ledge.
Figure 9:
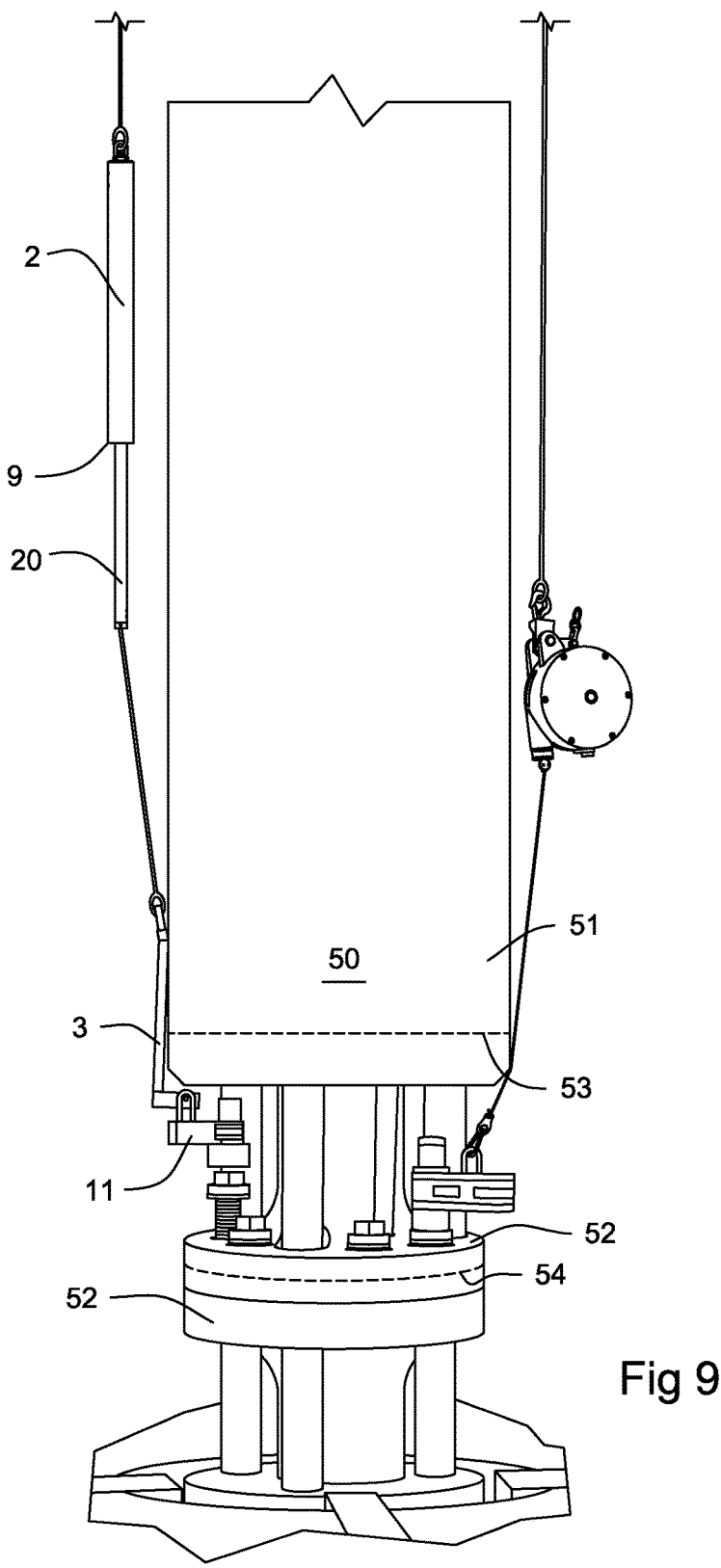
FIG. 9 is a comparison showing an embodiment of the present invention being used to support a tool on the left side of a riser and a prior art tensioner being used to support a tool on the right side of a riser.

A tool handling system 1 comprising a counter-balance 2 and a control bar 3 is disclosed. Counter-balance 2 preferably comprises complimentary springs 4. In the preferred embodiment, complimentary springs 4 comprise one or more compression springs 5 and one or more extension springs 6. As the names suggest, compression spring 5 is loaded when it is compressed. Thus, compression spring 5 will resist compression. Extension spring 6 is loaded when it is extended. Thus, extension spring 6 will resist extension.

Springs 5 and 6 are preferably concentrically positioned in a housing 7 having a suspension end 8 and a tool end 9. Suspension end 8 will be proximate the overhead structure supporting housing 7. The tool or other device being supported will be suspended, directly or indirectly, below tool end 9 of housing 7.

Extension spring 6 is preferably centrally positioned within housing 7 and depends from a suspension point 12. As force is applied to extension spring 6 by hanging a weight (directly or indirectly) from it, extension spring 6 will be loaded, causing extension spring 6 to apply a counter-gravitational force to the weight.

In a preferred embodiment, extension spring 6 is contained within an extension casing 20. Extension casing 20 is preferably secured to a compression block 10 slidably disposed within housing 7. In a preferred embodiment, casing 20 and block 10 are threaded together, though other conventional joining mechanisms could be utilized. In the preferred embodiment, spring 6 passes through compression block 10 and the two (6, 10) are not connected. The tool end 13 of spring 6 is mechanically connected to the tool end 14 of casing 20. Applying a linear force parallel to gravity to casing 20 will simultaneously apply a linear force parallel to gravity to extension spring 6.

Compression block 10 will move linearly—i.e., in the direction between suspension end 8 and tool end 9—within housing 7 in response to force applied to compression block 10 in a direction parallel to gravity. Applying force to extension casing 20 by hanging a weight from it will drive compression block 10 toward tool end 9 of housing 7.

Casing 20 is preferably made of ST-52.3 stainless steel or other strong, corrosion resistant material. Suitable casing is available from Scott Steel.

Compression spring 5 is preferably disposed around extension spring 6 and extension casing 20. Compression spring 5 is positioned between compression block 10 and tool end 9. Moving compression block 10 toward tool end 9 will compress compression spring 5. Thus, suspending a weight from extension casing 20 will load extension spring 6 and compression spring 5. When loaded, compression spring 6 will exert force on compression block 10, pushing block 10 toward supporting end 8 and away from tool end 9. Thus, compression spring 6 will, when housing 7 is vertically positioned, counter the gravitational force of a tool 11 depending from extension casing 20.

Extension spring 6 will, of course, also counter the gravitational force of tool 11 depending from casing 20. Thus, compression spring 5 and extension spring 6 will counter the gravitational force of tool 11. Moreover, further extension of spring 6 and compression of spring 5 will result in an increase in the counter-gravitational force applied to tool 11. By counter-gravitational, the inventor means force in the direction opposite that of gravity.

By properly balancing springs 4 and the weight of tool 11, counter-balance 2 will support tool 11 a maximum distance D from tool end 9. At distance D, the gravitational force exerted on tool 11 will equal the force applied to tool 11 by counter-balance 2. To the user, when tool 11 is at distance D, tool 11 will have a felt weight of 0 lbs. The user may lift tool 11 from distance D by manually applying pressure to tool 11. As tool 11 is raised, some of the load will be released from springs 4. As a result, springs 4 will apply slightly less counter-gravitational force and tool 11 will have a higher felt weight to the user. By way of example, in one preferred embodiment, a tool weighing about 330 pounds will have a felt weight of zero at distance D. If the tool is raised ten inches (D+10"), the tool will have a felt weight of about 35-40 pounds. It will be appreciated that as a user lifts tool 11 from position D, extension spring 6 will contract and compression spring 5 will expand and cause casing 20 to move linearly within housing 7 in a direction opposite that of gravity.

Significantly, springs 4 exert a counter-gravitational force on tool 11 that increases as tool 11 descends. In the example above, as the tool descends from D+10" to D, the counter-gravitational force will increase until the force equals the weight of the tool at D. Should tool 11 be dropped by the operator, rather than increasing in speed as it falls from D+10" (for example) to D, tool 11 would actually decelerate as it falls because the counter-gravitational force applied to tool 11 would increase during the fall.

Compression spring 5 is preferably disposed around extension casing 20. Although shown and described as two springs 5 positioned concentrically about casing 20, it will be appreciated that a single compression spring 5 or a plurality of compression springs 5 could be positioned around casing 20 with similar effect. As noted above, compression block 10 will load compression spring or springs 5 when a weight is applied to casing 20. Similarly, extension spring 6 could comprise multiple springs. The size and tension of springs 4 will vary depending upon the weight of tool 11 and any other equipment supported by counter-balance 2 and the desired distance D. Springs 4 are preferably made of class II oil tempered ASTM A229 steel. Suitable springs are available from Katy Spring & Manufacturing, Inc. of Katy, Tex.

A cable 21 will preferably depend from tool end 14 of casing 20. Tool 11 is preferably attached to cable 21. This will allow counter-balance 2 to be suspended well above the area where work is being performed. This will reduce the effect any motion of counter-balance 2 will have on tool 11.

In the preferred embodiment, a control bar 3 depends from cable 21 and tool 11 depends from control bar 3. Control bar 3 has a swivel engagement with tool end 14 of casing 20. Alternatively, a chain, wire rope, or the like could connect control bar 3 and tool end 14 of casing 20 or cable 21 could be omitted altogether.

In the preferred embodiment, cable 21 is about ten feet long, between casing 20 and tool 11.

Control bar 3 is comprised of an elongated central member 31 having a connection end 32 opposite a work end 33. Central member 31 has a longitudinal axis 34 that is parallel to the dimension between connection end 32 and work end 33. An engagement arm 35 extends from central member 31 proximate to work end 33 at an approximate right angle to longitudinal axis 34. A connection arm 36 extends from central member 31 proximate connection end 32. Connection arm 36 preferably engages cental member 31 at a reflex angle to longitudinal axis 34, most preferably about 225 degrees. Connection arm 36 is preferably angled in the opposite general direction compared to engagement arm 35 so that together, connection arm 36, central member 31 and engagement arm 35 form a rather elongated, deformed Z shape.

Tool 11 will depend from engagement arm 35. The connection between tool 11 and engagement arm 35 is preferably pivotable. Tool 11 is preferably balanced so that tool 11 will hang from the connection with engagement arm 35 so that tool 11 is perpendicular to the direction of gravity regardless of the general orientation of engagement arm 35.

Control bar 3 will allow tool 11 to be used on a riser 50 having a body 51 ending in a flange 52 wherein body 51 has a circumference 53 similar to or greater than the circumference 54 of flange 52. As discussed above, the increased circumference 53 of body 51 will often be a result of body 51 being fitted with buoyant material. Regardless of the reasons for its size, the fact that body 51 has a circumference 53 that extends beyond flange 52 creates a ledge 55, beneath which tool 11 must be maneuvered for work to be performed on flange 52, when riser 50 is vertically oriented.

The angle between central member 31 and connection arm 36 creates a pivot point 37 for control bar 3. In operation, connection arm 36 will rest on or generally parallel to body 51 of riser 50. By bringing pivot point 37 into contact with riser 50, control bar 3 may be pivoted on pivot point 37. This will bring central member 31 into alignment and typically also into contact with body 51. In turn, this will cause engagement arm 35 and tool 11 to move under ledge 55 and over flange 52. This will allow tool 11 to be positioned beneath ledge 55 without bringing a cable into contact with riser body 51, avoiding the potential risk of damage to the cable and loss of support of tool 11.

Control bar 3 is preferably comprised of 4140 stainless steel. It will be sized according to the weight of tool 11 and the dimensions of the space between ledge 55 and flange 52 or whatever space tool 11 is intended to operate. In the preferred embodiment, engagement arm 32 and central member 31 of control bar 3 are preferably sized according to the dimensions of the riser or other equipment on which they will be used. Typically, the components will be welded together for strength. Alternatively, control bar 3 may be provided with multiple interchangeable engagement arms 35 of differing dimensions in order to allow control bar 3 to be used with risers 50 having flanges 52 of varying dimensions or in other applications.

Tool 11 will depend from control bar 3 which will depend, directly or indirectly, from counter-balance 2. Where control bar 3 is to be used, the weight of control bar 3 will need to be taken into account when sizing and calibrating springs 4. Likewise, for cable 21.

In operation, tool 11 will hang at distance D from counter-balance 2. Tool 11 will have a felt weight of zero pounds at distance D because of the counter-gravitational force applied to tool 11 by springs 4. The operator will lift tool 11 to the desired height. In a preferred embodiment, where the desired height is about ten inches, tool 11 will have a felt weight of about 35-40 pounds, despite an actual weight in excess of 300 pounds, again because of the counter-gravitational force applied by springs 4. Tool 11 may be maneuvered horizontally using whatever mechanism is used to support tool handling system 1. Once tool 11 is in the approximate desired horizontal location and where tool 11 is being used to work on a riser 50, pivot point 37 of control bar 3 will be brought into contact with body 51 of riser 50. Continued inward pressure on tool 11 will pivot control bar 3 on pivot point 37. This will bring tool 11 into position over flange 52. Tool 11 may be lowered manually onto flange 52 and used thereon. Once work is complete, tool 11 may be lifted manually from flange 52. Again, springs 4 will allow the 300+ pound tool to be lifted from flange 52 with less than about 40 pounds of force. Tool 11 may be moved horizontally away from riser 50 and returned to distance D.

Although the preferred embodiment has been described, those skilled in the art to which the present invention pertains will appreciate that modifications, changes, and improvements may be made without departing from the spirit of the invention defined by the following claims.

We claim:

1. A system for supporting a tool, the system comprising:
   a counter-balance comprising:
      a housing configured to be suspended from an overhead support, said housing comprising a support end opposite a tool end;
      an extension spring depending from a fixed suspension point within said housing, said extension spring having a tool end opposite said suspension point;
      an extension casing depending from a compression block slidably disposed within said housing, said extension casing having a tool end opposite said compression block; wherein said extension spring is positioned within said extension casing and wherein said tool end of said extension spring is mechanically connected to said extension casing; and
      a compression spring positioned between said compression block and said tool end of said housing, whereby application of force to said tool end of said extension casing will load said extension spring and said compression spring; and
   a control bar suspended below said housing, said control bar comprising an elongated central member having a connection end opposite a work end and a dimension extending therebetween and a control bar longitudinal axis parallel to the dimension between said connection end and said work end; and
   an engagement arm extending from said central member proximate said work end at an approximate right angle to said control bar longitudinal axis; and
   a connection arm extending from said central member proximate said connection end at a reflex angle to said control bar longitudinal axis, wherein said reflex angle and said approximate right angle are measured from a common side of said control bar longitudinal axis and, wherein said connection arm is configured to support said tool.

2. A system for supporting a tool according to claim 1 wherein said control bar depends from said tool end of said extension casing.

3. A system for supporting a tool according to claim 2 wherein said control bar and said extension casing are provided with a cable connection.

4. A system for supporting a tool according to claim 1 wherein said connection arm and said central member meet at a pivot point.

5. A system for supporting a tool according to claim 4 wherein said reflex angle is about 225 degrees.

6. A system for supporting a tool according to claim 1 further comprising a plurality of extension springs.

7. A system for supporting a tool according to claim 1 further comprising a plurality of compression springs.

\* \* \* \* \*